(12) United States Patent
Wells

(10) Patent No.: US 6,789,354 B2
(45) Date of Patent: Sep. 14, 2004

(54) DISPENSING CAPSULE FOR INJECTING PLANTS WITH PESTICIDES AND NUTRIENTS

(76) Inventor: Timothy Wells, 571 Hampshire Rd., #236C, Westlake Village, CA (US) 91361

( * ) Notice: Subject to any disclaimer, the term of this patent is extended or adjusted under 35 U.S.C. 154(b) by 0 days.

(21) Appl. No.: 10/307,465

(22) Filed: Dec. 2, 2002

(65) Prior Publication Data

US 2003/0196374 A1 Oct. 23, 2003

Related U.S. Application Data

(63) Continuation-in-part of application No. 29/159,143, filed on Apr. 17, 2002, now Pat. No. Des. 476,866.

(51) Int. Cl.[7] ............................................. A01G 29/00
(52) U.S. Cl. .................... 47/57.5; 47/48.5; 222/209; 222/386.5
(58) Field of Search ........................... 47/48.5, 1.5, 1.7, 47/57.5, DIG. 10, 8, 10, 11; D8/1; 111/118, 7.2; 427/291; 8/402; 222/631, 632, 633, 491, 494, 527, 213, 209, 225, 385, 206, 386.5; A01G 29/00

(56) References Cited

U.S. PATENT DOCUMENTS

| | | | | |
|---|---|---|---|---|
| D176,733 S | * | 1/1956 | Pollnow | |
| 2,948,238 A | * | 8/1960 | Hoffman | 111/7.4 |
| 3,286,401 A | * | 11/1966 | Mauget | 47/57.5 |
| 3,346,194 A | * | 10/1967 | Enblom | 239/333 |
| 4,051,981 A | * | 10/1977 | Mandlak | 222/189.02 |
| 4,144,673 A | | 3/1979 | Quast et al. | 47/57.5 |
| D260,817 S | * | 9/1981 | Christine | D24/58 |
| 4,365,440 A | * | 12/1982 | Lenardson | 47/57.5 |
| D269,706 S | * | 7/1983 | Green | D24/63 |
| D273,266 S | * | 4/1984 | Souza | D8/2 |
| 4,989,366 A | * | 2/1991 | DeVlieger | 47/57.5 |
| 5,239,773 A | | 8/1993 | Doolittle, Jr. | 47/57.5 |
| 5,249,391 A | * | 10/1993 | Rodgers | 47/57.5 |
| 5,945,076 A | * | 8/1999 | Leonard et al. | 422/300 |
| 6,032,411 A | * | 3/2000 | Foust | 47/57.5 |
| D476,866 S | * | 7/2003 | Wells et al. | D8/2 |

FOREIGN PATENT DOCUMENTS

FR 002630712 A1 * 11/1989 ........... B65D/47/28

* cited by examiner

Primary Examiner—Peter M. Poon
Assistant Examiner—Andrea M. Valenti
(74) Attorney, Agent, or Firm—Donald Diamond

(57) ABSTRACT

A disposable dispensing capsule for a plant injectable liquid composition includes a flexible cap hermetically sealed to a receptacle. The capsule is pressurized when the cap is forcibly flexed inwardly. In one embodiment flexure and thereby pressurization are maintained by an interference fit between a spindle in the receptacle and a socket depending downwardly from the cap central portion. In another embodiment flexure is maintained by engagement of hook-shaped posts in the receptacle with a lip in a collar depending downwardly from the cap central portion.

14 Claims, 6 Drawing Sheets

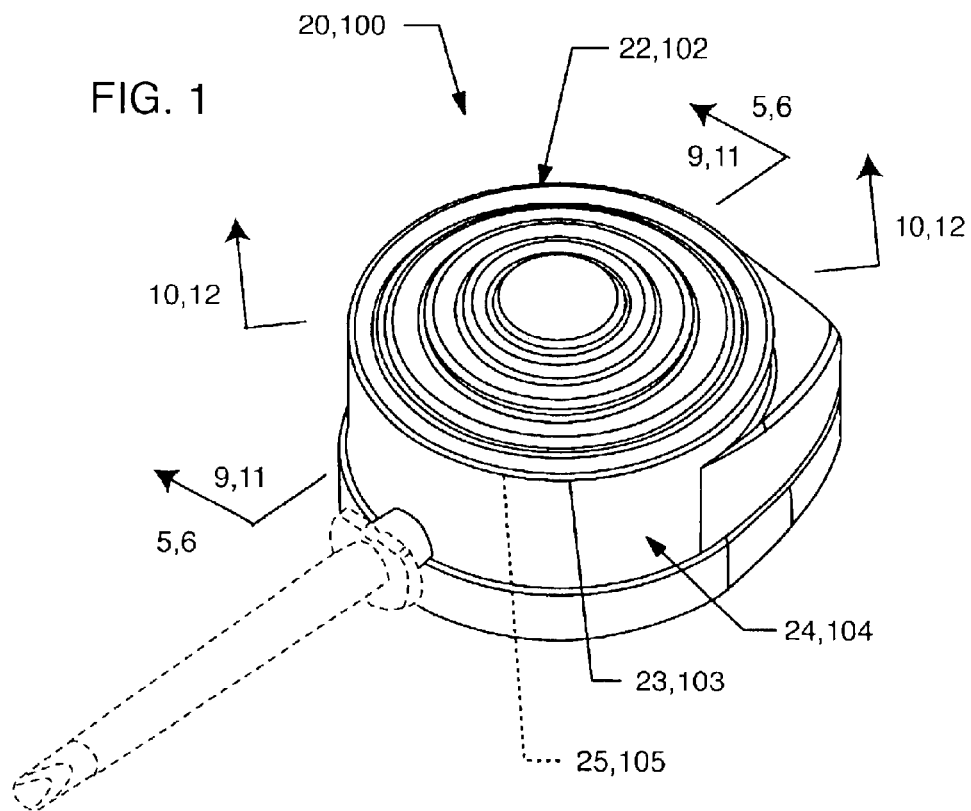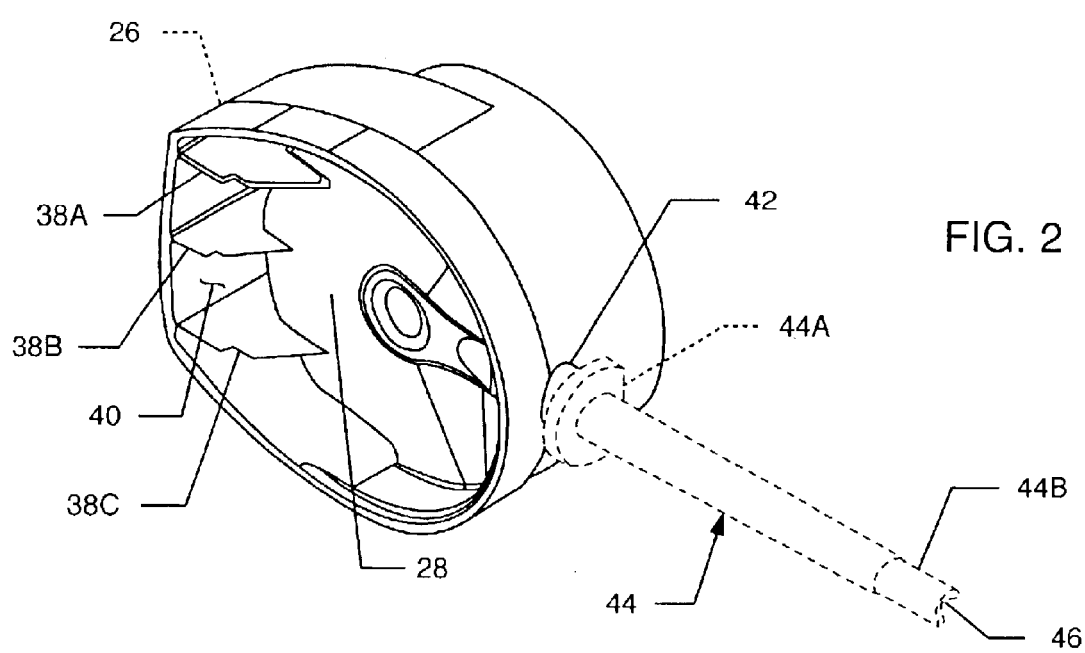

DISPENSING CAPSULE FOR INJECTING PLANTS WITH PESTICIDES AND NUTRIENTS

CROSS-REFERENCE TO RELATED APPLICATION

This application is a continuation-in-part of application Ser. No. 29/159,143 filed Apr. 17, 2002 U.S. Pat. No. D,476,866, entitled "Dispensing Capsule for Pesticides and Nutrients," now pending.

BACKGROUND OF THE INVENTION

1. Field of the Invention

The invention relates to devices for injecting plants, principally trees, with therapeutic liquid compositions such as pest control agents and nutrients. More particularly, it relates to devices providing for safe handling of toxic liquids in economical disposable containers within which a slight super-atmospheric pressure can be developed by the user which forces the liquid contents out of the container and into a feeder tube inserted into a tree trunk or other plant stem.

2. Description of the Related Art

The treatment of plants, especially trees, through injection of pest control agents and liquid nutrients has been known for some time. U.S. Pat. No. 3,286,401 to J. J. Mauget ("'401") discloses an apparatus and method for such treatment wherein a container including two mutually slidable cups with spaced interlocks is used in combination with a feeder tube which at one end penetrates a frangible diaphragm sealing a container aperture; the other end is driven into the plant stem. The telescopically compressible cups provide a container with a variable interior volume partially filled with a liquid composition; the remainder of the volume is occupied by a gaseous substance such as air. Sealing of the liquid contents is effected by means of interference fits between the concentric, smooth walls of the cups. This arrangement does not always provide a reliable seal. Small variations in the concentricities and dimensions of the cups and/or in atmospheric pressure, as well as imperfections due to interior surface scratches can permit discharge between the mutually slidable walls of at least a portion of the contents during shipment or storage. Such leakage is especially likely to occur if the liquid has a high affinity for forming a capillary film. Since liquid compositions such as insecticides and fungicides used to treat plants may be toxic or otherwise harmful to humans, it is important that the possibility of leakage under shipment, storage and operational conditions be eliminated.

U.S. Pat. No. 4,365,440 ("'440") to D. D. Lenardson discloses a similar telescopically compressible container with improved sealing. The container includes a pair of cup-like body portions having interfitting and mutually slidable sidewalls which telescopically engage through open ends of the portions. The upper portion (or closure) has a base and a depending cylindrical sidewall. The lower portion (or receptacle) has a base and outer and inner concentric, spaced cylindrical sidewalls determining an annular socket for slidably receiving the closure sidewall. The distance between two parallel rings projecting from the outer surface of the closure sidewall determines the extent of axial travel of the compressed container. The inner surface of the receptacle outer wall has a groove for successively receiving the rings. A ratchet-like ring configuration impedes reversible disengagement of the closure from the receptacle while permitting forward, telescopically compressible relative movement of the receptacle and closure. Compression of the internal volume of the container pressurizes the fluid contents, forcing liquid into a connected feeder tube. Although the seal provided by the ring-and-groove combination minimizes leakage, it is not totally hermetic.

U.S. Pat. No. 5,249,391 to J. A. Rodgers discloses a telescopically compressible binary container including an integrated liquid discharge tube. The container is intended to be non-disposable, in contrast to the '401 and '440 containers. The tube, which is slidably carried by a guide tube, resists being pulled from the guide tube when it is withdrawn from a tree upon completion of an injection operation. A resiliently deformable latch on one container section and a latch surface and cam means on the other container section engageable with the latch combine to provide locking in the compressed position. The container sections may be divided into separate volumes for storing dissimilar liquid and liquid or solid compositions. When a seal is ruptured by piercing means carried by the latch, the several compositions are mixed prior to entering the discharge tube.

Other devices for injecting plants which do not utilize the technique of self-pressurizing a compressible binary container are known. For example, U.S. Pat. No. 6,032,411 to V. K. Foust and U.S. Pat. No. 5,239,773 to G. D. Doolittle, Jr. disclose a two-piece syringe, U.S. Pat. No. 4,989,366 to T. A. DeVlieger discloses a device including a plunger and funnel, and U.S. Pat. No. 4,144,673 to D. H. Quast et al. discloses a gravity-fed multi-injector system.

OBJECTS OF THE INVENTION

It is a primary object of the present invention to provide a hermetically sealed, disposable capsule for injecting a plant with a liquid composition which will not leak during shipment, storage or during an injection operation.

Another object of the invention is to provide a telescopically compressible capsule which will remain locked when in a pressurized state.

Yet another object of the invention is to provide a capsule which is inexpensive to fabricate and suitable for mass production using thermoplastic injection molding.

Other objects of the invention will become evident when the following description is considered with the accompanying drawing figures. In the figures and description, numerals indicate the various features of the invention, like numerals referring to like features throughout both the drawings and description.

SUMMARY OF THE INVENTION

These and other objects are achieved by the present invention which in one aspect provides a plant injection dispensing capsule including a receptacle containing a therapeutic liquid composition and having a floor and a wall, orthogonal to the floor, terminating in a rim. The capsule further includes a cap having a central portion, a flexible portion symmetric about the central portion, and a circumferential edge hermetically sealed to the rim. The capsule further includes means for maintaining inward flexure of the flexible portion, thereby keeping the capsule pressurized.

In another aspect the invention provides a plant injection dispensing capsule including a receptacle containing a therapeutic liquid composition and having a planar floor and a cylindrical wall, orthogonal to the floor, terminating in a circular rim. The wall has an aperture proximate to the floor sealed by a dislodgeable membrane, and the floor has a channel proximate to the aperture. The capsule further includes a cap having a rigid central portion circumscribed by a living hinge including concentric annuluses bridged by stepped ridges orthogonal to the annuluses, and a circular edge hermetically sealed to the rim. The living hinge flexes inwardly when a downward force is applied to the cap central portion. The receptacle further includes an upwardly tapering spindle depending upwardly from the floor and having an outer surface. The cap further includes a polygonal-shaped socket, depending downwardly from its central portion, having a polygonal bore determined by a plurality of planar surfaces. The spindle is forcibly received within the bore when the living hinge is forcibly flexed inwardly, thereby pressurizing the capsule and creating an interference fit between the spindle outer surface and the socket bore surfaces which maintains the inward flexure.

In still another aspect the invention provides a plant injection dispensing capsule including a receptacle containing a therapeutic liquid composition and having a planar floor and a cylindrical wall, orthogonal to the floor, terminating in a circular rim. The wall has an aperture proximate to the floor sealed by a dislodgeable membrane, and the floor has a channel proximate to the aperture. The capsule further includes a cap having a rigid central portion circumscribed by concentric annuluses bridged by stepped ridges orthogonal to the annuluses, and a circular edge hermetically sealed to the rim. The cap flexes inwardly when a downward force is applied to its central portion. The receptacle further includes three posts depending upwardly from the floor. Each post has a hook-shaped upper portion with a planar lower surface, and a lower portion orthogonal to the floor. The cap further includes a cylindrical collar, depending downwardly from its central portion, having a distally tapering end portion with a circumferential groove determining an annular lip having a generally planar upper surface. The lower surface of each post upper portion engages the lip upper surface when the cap is forcibly flexed inwardly, thereby maintaining the inward flexure to keep the capsule pressurized.

A more complete understanding of the present invention and other objects, aspects and advantages thereof will be gained from a consideration of the following description of the preferred embodiments read in conjunction with the accompanying drawings provided herein.

BRIEF DESCRIPTION OF THE DRAWINGS

FIG. 1 is a perspective view of a plant injection dispensing capsule including a cap and receptacle, according to first and second embodiments of the invention.

FIG. 2 is a perspective view of the underside of the FIG. 1 capsule.

DETAILED DESCRIPTION OF THE PREFERRED EMBODIMENTS

I. Introduction

Figure 3:
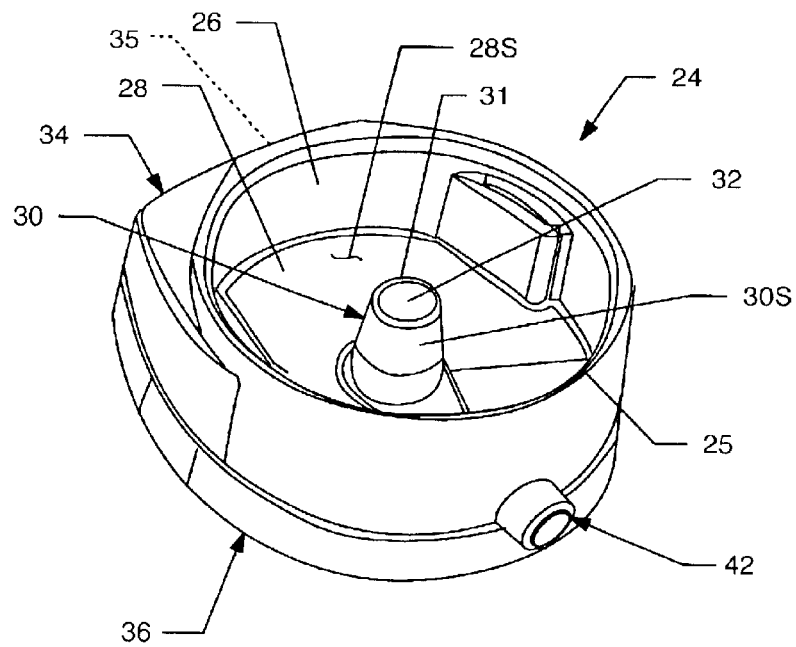
FIG. 3 is a perspective view of the FIG. 1 receptacle according to the first embodiment including a floor, a cylindrical wall, a spindle depending upwardly from the floor, and a housing having a planar surface.

While the present invention is open to various modifications and alternative constructions, the preferred embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

Referring to FIGS. 1, 2 and 3, a plant injection dispensing capsule 20 according to a first embodiment of the invention includes a cap 22 having a circumferential, generally circular edge 23 hermetically sealed to a circumferential, generally circular rim 25 of a receptacle 24. As best shown in FIG. 3, receptacle 24 has an interior volume determined by a circumferential, generally cylindrical wall 26, terminating upwardly in rim 25, which is generally orthogonal to a generally planar floor 28 having an upper surface 28S. Depending upwardly from floor 28 and proximate to its center of symmetry is an upwardly tapering spindle 30, in the shape of a conical frustum, having an outer surface 30S, a top 31 and a bore 32. Receptacle 24 further includes a housing 34 attached to wall 26 which provides a generally planar force application surface 35, a hollow base 36 for the capsule, and structural support for the wall. As shown in FIG. 2, ribs 38A, 38B, 38C are attached between an interior surface 40 of housing 34, and wall 26 and floor 28. Wall 26 includes an aperture 42 proximate to floor 28 and external to housing 34 into which is inserted an inner end 44A of a feeder tube 44 (not part of the invention) having an outer end 44B terminating in an outlet 46. Alternatively, the aperture may be internal to the housing. As is described below, and in an illustrative technique, feeder tube outer end 44B is inserted into a pre-drilled hole in a tree trunk or plant stem and the aperture 42 of a pre-pressurized capsule is slidably positioned over the feeder tube inner end 44A to secure the capsule to the feeder tube. Preferably, receptacle 24 is molded as a single unit from polypropylene or a similar thermoplastic. Most preferably, the receptacle is molded from a clarified polypropylene copolymer which includes propene, ethene and modifiers/additives, such as product P5M6K-048 available from Huntsman Polymers Corporation of Houston, Tex.

Figure 4A:
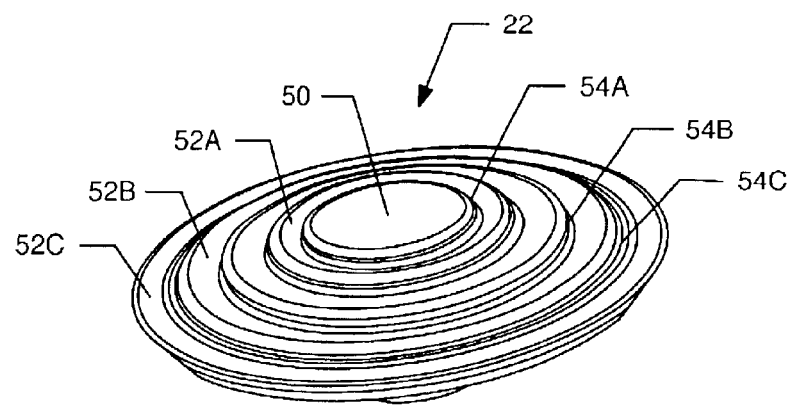
FIG. 4A is a top perspective view of the FIG. 1 cap according to the first embodiment.
Figure 4B:
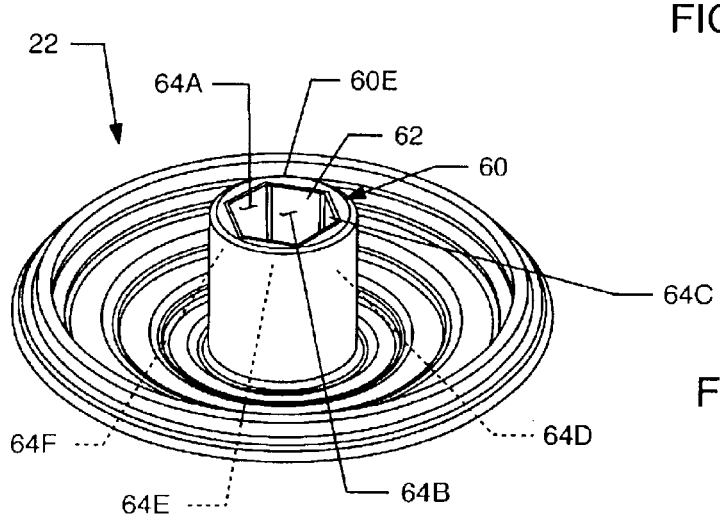
FIG. 4B is an underside perspective view of the FIG. 1 cap according to the first embodiment.

Referring to FIGS. 4A and 4B, cap 22 includes a rigid central portion 50 circumscribed by a plurality of concentric annuluses 52A, 52B, 52C bridged consecutively pairwise, respectively, by a plurality of stepped ridges 54A, 54B, 54C generally orthogonal to the annuluses so that the cap initially is convexly arcuate. The ridges act as "living hinges" enabling cap 22 to flex inwardly when a downward force, as by a thumb, is applied to central portion 50, depressing the portion. Depending downwardly from portion 50 is a socket 60 terminating in an end 60E and having a hexagonal-shaped bore 62 determined by a plurality of generally planar surfaces 64A, 64B, 64C, 64D, 64E, 64F. Preferably, cap 22 is molded as a single unit from polypropylene or a similar thermoplastic. Most preferably, the cap is molded from a clarified polypropylene copolymer such as Huntsman product P5M6K-048.

Figure 5:
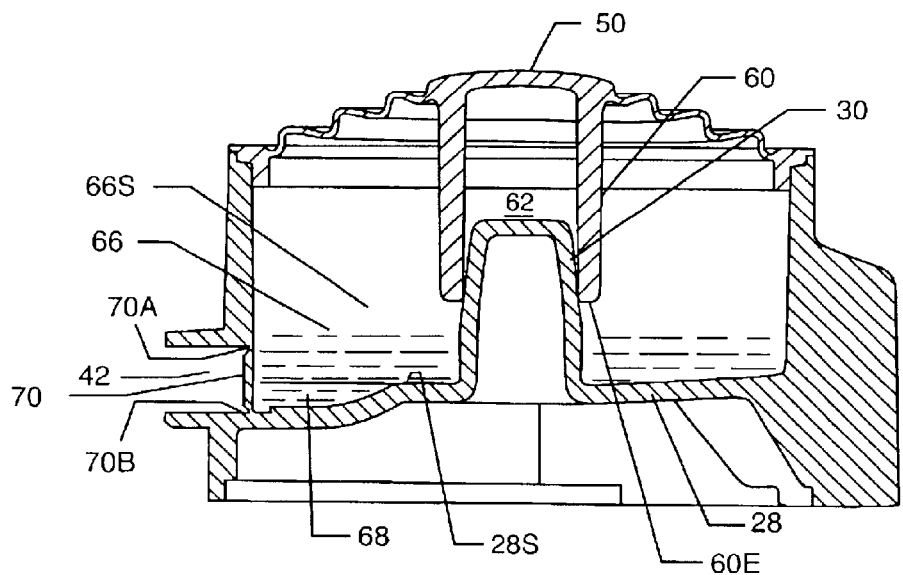
FIG. 5 is a sectional view of the FIG. 1 capsule according to the first embodiment, along cutting plane 5—5, before the cap is flexed inwardly.
Figure 6:
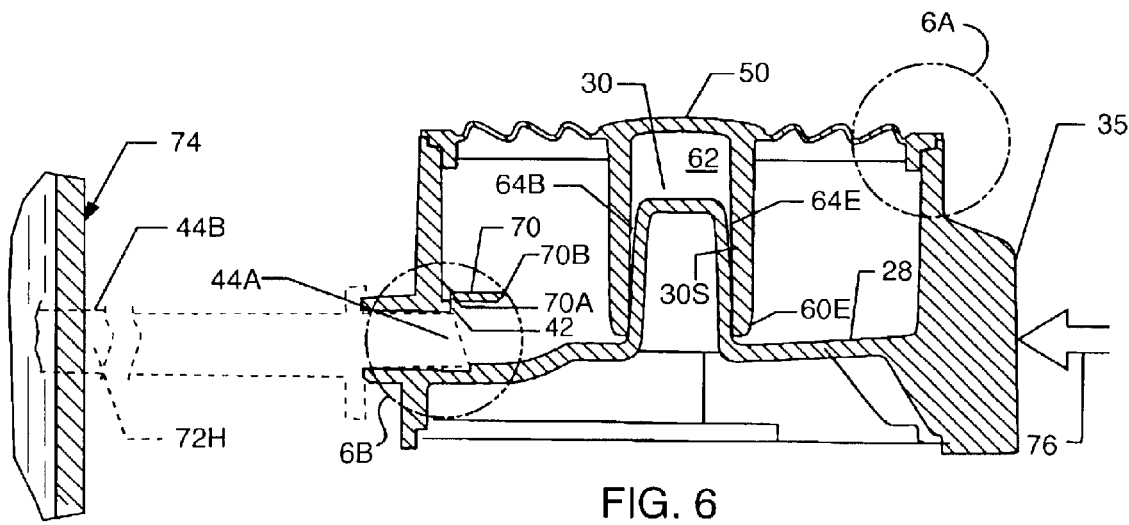
FIG. 6 is a sectional view of the FIG. 1 capsule according to the first embodiment, along the FIG. 5 cutting plane, after the cap has been flexed inwardly, pressurizing the capsule, an aperture in the wall has been slidably postioned over one end of a feeder tube inserted into a tree trunk or plant stem, and a force has been applied to the FIG. 3 planar surface so that the tube end dislodges a membrane within the aperture.
Figure 6A:
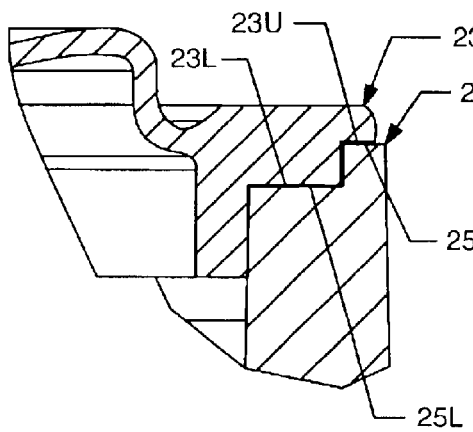
FIG. 6A is a detail view of region "6A" in FIG. 6.
Figure 6B:
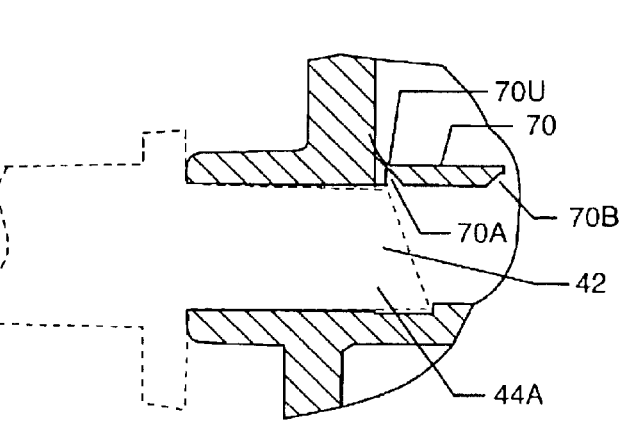
FIG. 6B is a detail view of region "6B" in FIG. 6.

FIG. 5 depicts capsule 20 in its initial (unpressurized) state. Receptacle 24 contains a preselected amount of a therapeutic liquid composition 66 having a surface 66S. (For clarity of the other first embodiment figures, liquid composition 66 is shown only in FIG. 5.) Preferably, the amount of liquid is in a range from about 1 to about 6 milliliters (ml). For a greater amount up to about 25 ml, a compressible cap with a higher profile than cap 22 should be used to provide greater displacement for developing a suitable dispensing pressure. Spindle 30 is closely received within socket bore 62. Because cap portion 50 has not yet been depressed, socket end 60E is disposed only about halfway down the spindle. Floor 28 includes a channel 68 in surface 28S proximate to aperture 42 which ensures that even a small amount of liquid within the receptacle will be accessible to the aperture and thence the feeder tube. Aperture 42 is sealed by a dislodgeable "knockout" membrane 70. As indicated by grooves 70A, 70B in FIGS. 5, 6 and 6B, the membrane includes a peripheral annular thinned-out portion which contacts the receptacle wall. FIG. 6 depicts capsule 20 after portion 50 has been depressed, pre-pressurizing the capsule, tube end 44B has been inserted into a pre-drilled hole 72H in a tree trunk or plant stem 74, aperture 42 has been slidably positioned over tube end 44A, and a force 76 has been applied to surface 35 such that tube end 44A dislodges membrane 70. Spindle 30 is forced deeper into bore 62 so that end 60E becomes proximate to floor 28. Socket 60 is maintained in this position by an interference fit between surface 30S and surfaces 64A–64F. Tube end 44A is adapted to dislodge membrane 70 circumferentially except at an upper end 70U so that the membrane pivots inwardly (see FIG. 6B). Alternatively, a frangible membrane may be used with the tube end adapted for rupturing rather than dislodging the membrane. FIG. 6A shows how the cap attaches to the receptacle. Edge 23 includes generally parallel upper and lower lips 23U, 23L, respectively. Rim 25 includes an upper surface 25S and a lip 25L. Lip 23U mates with surface 25S, and lip 23L mates with lip 25L. Preferably, edge 23 and rim 25 are attached by ultrasonic welding. Suitable welders are manufactured by Branson Ultrasonics Corporation of Danbury, Conn. Preferably, capsule 20 is about 2¼ inches in length, 2⅛ inches in width, and 1⅜ inches in height.

Figure 7:
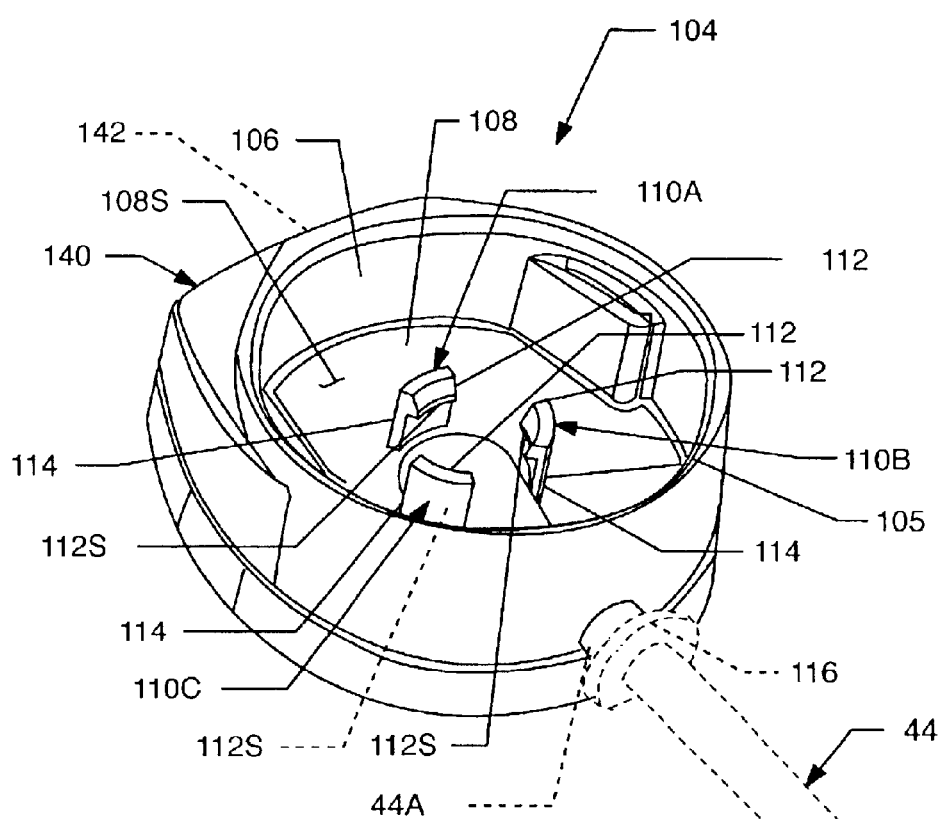
FIG. 7 is a perspective view of the FIG. 1 receptacle according to the second embodiment including a floor, a cylindrical wall, three posts depending upwardly from the floor, and a housing having a planar surface.
Figure 8:
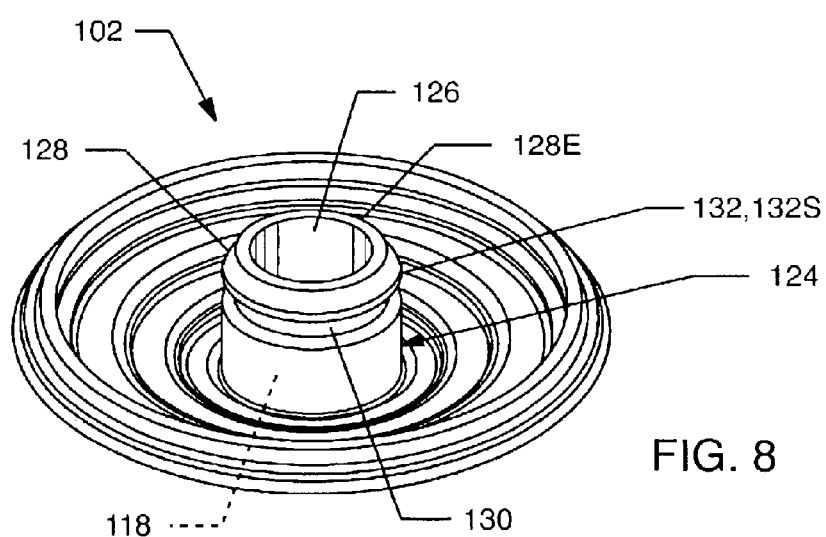
FIG. 8 is an underside perspective view of the FIG. 1 cap according to the second embodiment.

Referring to FIGS. 1, 7 and 8, a plant injection capsule 100 according to a second embodiment of the invention includes a cap 102 having a circumferential, generally circular edge 103 hermetically sealed to a circumferential, generally circular rim 105 of a receptacle 104. The cap and receptacle are attached as in the first embodiment (see FIG. 6A), preferably by ultrasonic welding. As shown in FIG. 7, receptacle 104 has an interior volume determined by a circumferential, generally cylindrical wall 106, terminating upwardly in rim 105, which is generally orthogonal to a generally planar floor 108 having an upper surface 108S. Receptacle 104 further includes a housing 140 attached to wall 106 which provides a generally planar force application surface 142. Attached to and depending upwardly from floor 108 and generally symmetric about its center of symmetry are first, second and third posts 110A, 110B, 110C each having a hook-shaped upper portion 112 with a generally planar lower surface 112S, and a lower portion 114 generally orthogonal to surface 112S. As in the first embodiment, wall 106 includes an aperture 116 proximate to floor 108.

Figure 9:
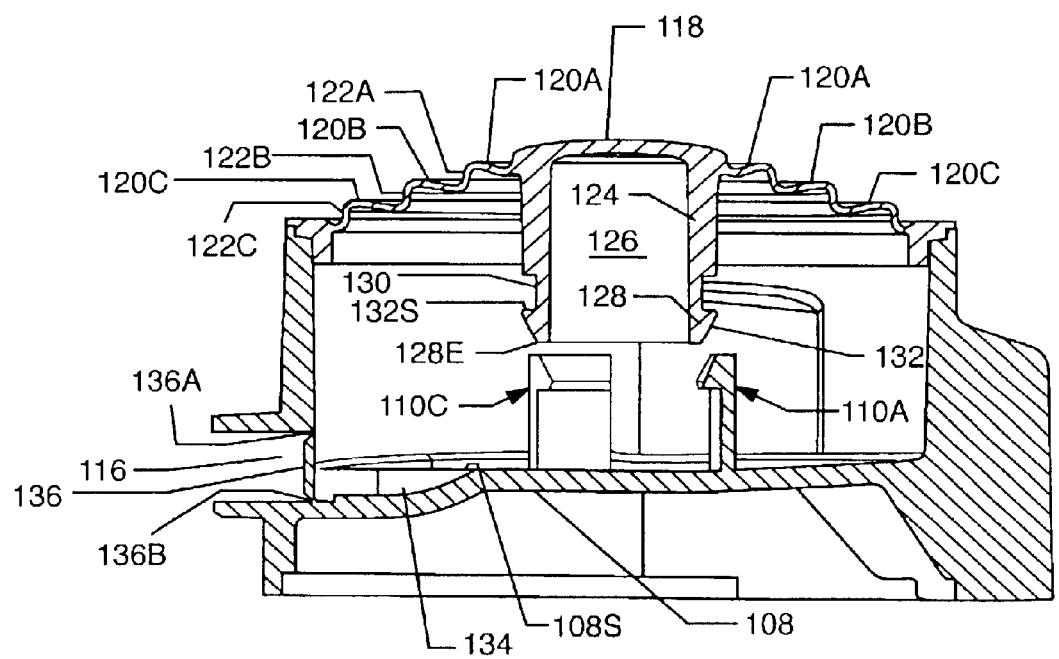
FIG. 9 is a sectional view of the FIG. 1 capsule according to the second embodiment, along cutting plane 9—9, before the cap is flexed inwardly.
Figure 10:
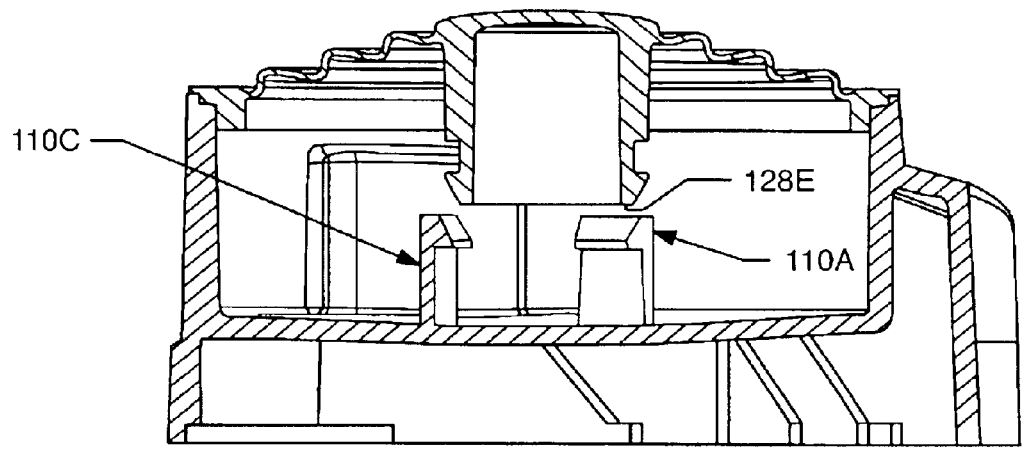
FIG. 10 is a sectional view of the FIG. 1 capsule according to the second embodiment, along cutting plane 10—10, before the cap is flexed inwardly.
Figure 11:
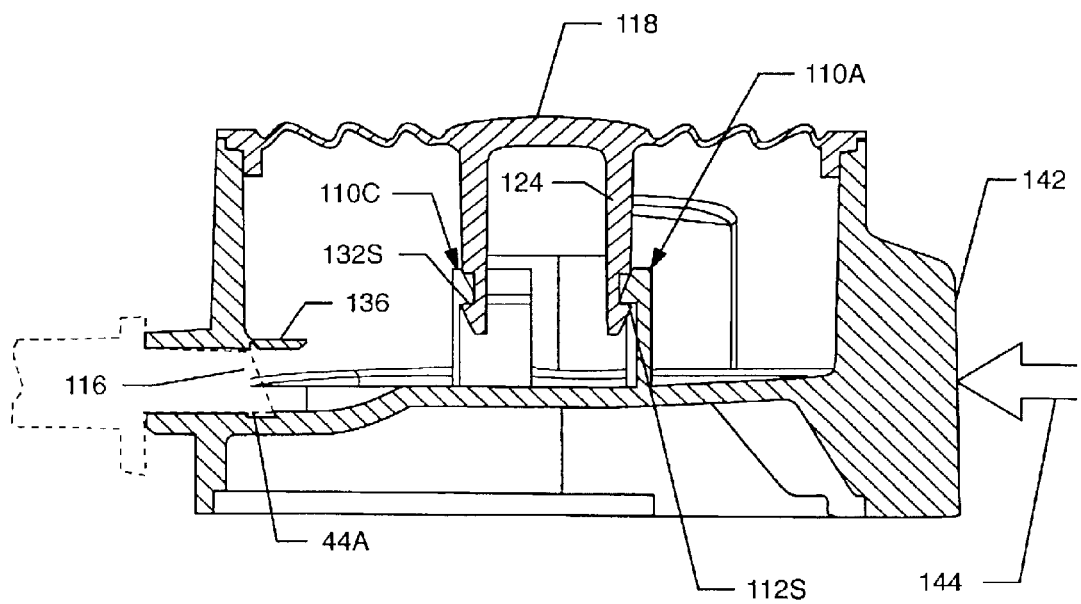
FIG. 11 is a sectional view of the FIG. 1 capsule according to the second embodiment, along cutting plane 11—11, after the cap is flexed inwardly, pressurizing the capsule, an aperture in the wall has been slidably postioned over one end of a feeder tube inserted into a tree trunk or plant stem, and a force has been applied to the FIG. 7 planar surface so that the tube end dislodges a membrane within the aperture.
Figure 12:
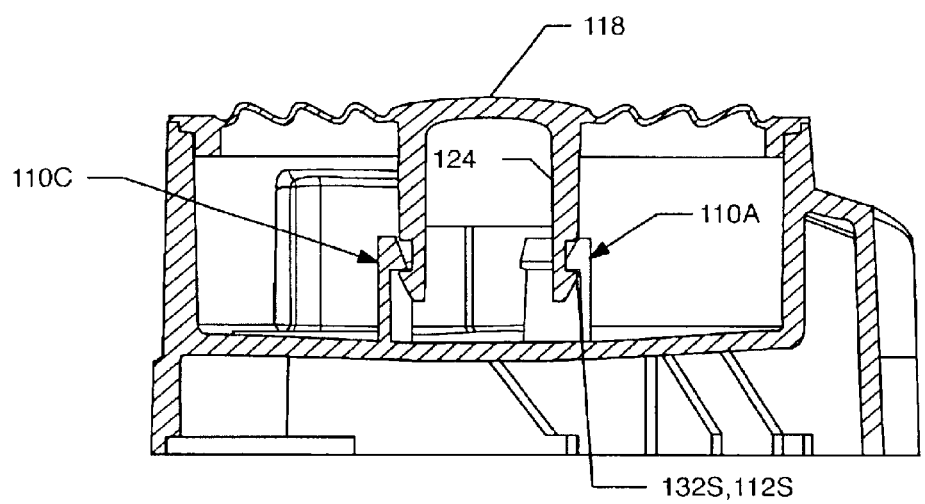
FIG. 12 is a sectional view of the FIG. 1 capsule according to the second embodiment, along cutting plane 12—12, after the cap is flexed inwardly, pressurizing the capsule.

Referring to FIGS. 8 and 9, the top of cap 102 is identical to that of cap 22; i.e., the cap includes a rigid central portion 118 circumscribed by a plurality of concentric annuluses 120A, 120B, 120C bridged consecutively pairwise, respectively, by a plurality of stepped ridges 122A, 122B, 122C which enable the cap to flex inwardly. Depending downwardly from portion 118 is a generally cylindrical collar 124 having a bore 126 and a distally tapering end portion 128 terminating in an end 128E. Portion 128 includes a circumferential groove 130 proximate to end 128E which determines an annular lip 132 having a generally planar upper surface 132S. FIGS. 9 and 10 depict capsule 100 in its initial (unpressurized) state, with end 128E disposed slightly above the posts. (As in the first embodiment, receptacle 104 contains a preselected amount of liquid composition; for clarity this is not shown in any of the second embodiment figures. The preferred amount is in the same range as for the first embodiment.) As in the first embodiment, floor 108 includes a channel 134 in surface 108S proximate to aperture 116, and aperture 116 is sealed by a dislodgeable membrane 136. As indicated by grooves 136A, 136B (see FIGS. 9 and 11), the membrane includes a peripheral annular thinned-out portion which contacts the receptacle wall. FIGS. 11 and 12 depict capsule 100 after portion 118 is depressed, pressurizing the capsule, aperture 116 is slidably positioned over feeder tube end 44A after tube end 44B is inserted into a tree trunk or plant stem (see FIG. 6), and a force 144 is applied to surface 142, dislodging membrane 136. Collar 124 is forced downward so that lower surfaces 112S of posts 111A, 110B, 110C engage surface 132S. The resilience of the cap "living hinge" maintains the surfaces in locked combination.

As in the first embodiment, preferably cap 102 and receptacle 104 are molded as single units from polypropylene or a similar thermoplastic, and most preferably from a clarified polypropylene copolymer such as Huntsman product P5M6K-048. Preferably, capsule 100 has the same dimensions as capsule 20.

What is claimed is:
1. A plant injection dispensing capsule comprising:
    a receptacle having a floor, and a circumferential wall generally orthogonal to the floor and terminating upwardly in a rim, the receptacle containing a preselected amount of a therapeutic liquid composition;
    a cap having a rigid central portion a flexible portion symmetric about the central portion comprising a living hinge having a plurality of concentric annuluses bridged consecutively pairwase by a plurality of stepped ridges, the ridges generally orthogonal to the annuluses so that the cap initially is convexly arcuate, and a circumferential edge hermetically sealed to said rim;

a spindle depending upwardly from the receptacle floor and having an outer surface; and a socket depending downwardly from the can central portion and having a bore determined by a plurality of generally planar surfaces, the spindle forcibly received within the bore when said flexible portion is flexed inwardly, thereby pressurizing the capsule and creating an interference fit between said outer surface and said planar surfaces which maintains the inward flexure, thus dispensing a therapeutic liquid into a plant.

2. The capsule of claim 1 wherein said means for maintaining inward flexure of the flexible portion comprises:

a plurality of posts depending upwardly from the receptacle floor, each post having a hook-shaped upper portion with a generally planar lower surface; and a collar depending downwardly from the cap central portion, having an end portion with a circumferential groove determining an annular lip having a generally planar upper surface, each said lower surface engaging said upper surface.

3. The capsule of claim 1 wherein the cap edge is hermetically sealed to the receptacle rim by ultrasonic welding.

4. The capsule of claim 1 wherein said amount of liquid composition is in a range from about 1 milliliter to about 6 milliliters.

5. The capsule of claim 1 wherein the cap and receptacle are fabricated from a thermoplastic.

6. The capsule of claim 5 wherein said thermoplastic is a clarified polypropylene.

7. A plant injection dispensing capsule comprising:

a receptacle having a generally planar floor, an upwardly tapering spindle depending upwardly from said floor and having an outer surface, and a circumferential, generally cylindrical wall generally orthogonal to the floor and terminating upwardly in a circumferential, generally circular rim, the wall having an aperture proximate to the floor and sealed by a dislodgeable membrane, the floor having a channel proximate to the aperture, the receptacle containing a preselected amount of a therapeutic liquid composition; and a cap having a rigid central portion circumscribed by a living hinge comprising a plurality of concentric annuluses bridged consecutively pairwise by a plurality of stepped ridges, the ridges generally orthogonal to the annuluses so that the cap initially is convexly arcuate, the cap further having a polygonal-shaped socket depending downwardly from said central portion and having a plurality of generally planar surfaces, the cap further having a circumferential, generally circular edge hermetically sealed to said rim, the spindle forcibly received within the bore when the living hinge is flexed inwardly, thereby pressurizing the capsule and creating an interference fit between the spindle outer surface and socket bore surfaces which maintains the inward flexure, thus dispensing a therapeutic liquid into a plant.

8. The capsule of claim 7 wherein the receptacle further comprises a housing attached to said wall having a generally planar surface to which a force is applied after the capsule is pressurized and said aperture is slidably positioned over an end of a feeder tube inserted into a plant, said force causing the tube end to dislodge said membrane.

9. The capsule of claim 8 wherein:

the receptacle further comprises first, second and third posts depending upwardly from the floor, each post having a hook-shaped upper portion with a generally planar lower surface, and a lower portion generally orthogonal to the floor; and the cap further comprises a generally cylindrical collar depending downwardly from said central portion and having a distally tapering end portion having a circumferential groove determining an annular lip having a generally planar upper surface, each said lower surface engaging the upper surface when the cap is forcibly flexed inwardly, thereby pressurizing the capsule and maintaining the inward flexure.

10. The capsule of claim 9 wherein:

the cap edge is hermetically sealed to the receptacle rim by ultrasonic welding;

the amount of liquid composition is in a range from about 1 milliliter to about 6 milliliters; and the cap and receptacle are fabricated from a thermoplastic.

11. The capsule of claim 9 wherein said thermoplastic is a clarified polypropylene.

12. The capsule of claim 7 wherein said plurality of surfaces is six.

13. The capsule of claim 7 wherein:

the cap edge is hermetically sealed to the receptacle rim by ultrasonic welding;

the amount of liquid composition is in a range from about 1 milliliter to about 6 milliliters; and the cap and receptacle are fabricated from a thermoplastic.

14. The capsule of claim 13 wherein said thermoplastic is a clarified polypropylene.

* * * * *